United States Patent [11] 3,614,728

| [72] | Inventors | Martin J. Borrok<br>Berkeley;<br>Robert E. Perkinson, St. Louis County;<br>Fred D. Watson, St. Louis County; Wilbur<br>H. Von Fange, Kirkwood, all of Mo. |
|---|---|---|
| [21] | Appl. No. | 17,256 |
| [22] | Filed | Mar. 6, 1970 |
| [45] | Patented | Oct. 19, 1971 |
| [73] | Assignee | McDonnell Douglas Corporation<br>St. Louis, Mo. |

[54] INDICATOR MEANS FOR COLLISION AVOIDANCE SYSTEMS
18 Claims, 10 Drawing Figs.

[52] U.S. Cl. .................................................. 340/23,
343/112.4
[51] Int. Cl. .................................................. G08g 5/04
[50] Field of Search ........................................... 340/23;
343/6.5, 112.4

[56] References Cited
UNITED STATES PATENTS
| 3,114,145 | 12/1963 | Vielle et al. ............... | 343/6.5 |
| 3,208,064 | 9/1965 | Morrel ..................... | 343/112.4 UX |
| 3,341,812 | 9/1967 | Perkinson et al. ......... | 340/23 |

Primary Examiner—Kathleen H. Claffy
Assistant Examiner—Jan S. Black
Attorney—Charles B. Haverstock ABSTRACT: A single control panel indicator for aircraft cockpits combining collision avoidance warning means to indicate what command maneuver should be made to avoid being on a collision course with means for indicating rate of climb and maximum permissible rate of climb information from which the pilot will be advised as to how fast he can safely change his altitude during an escape maneuver and at other times and still remain on a safe course.

PATENTED OCT 19 1971 3,614,728

TIME →
OUTPUT PULSES OF GENERATORS

INDICATOR MEANS FOR COLLISION AVOIDANCE SYSTEMS

The present invention is an improvement over known indicator means for collision avoidance systems including the indicator means disclosed in Perkinson et al. U.S. Pat. No. 3,341,812, dated Sept. 12, 1967, and assigned existence applicants' assignee.

One of the problems of known collision avoidance systems including the system disclosed in U.S. Patent No. 3,341,812 is that the aircraft control panel instruments for such systems only produce indications as to the existence or nonexistence of a threatening condition and what maneuver should be made to avoid collision, but the known indicator devices do not include nor do they take into account the vertical separation that may exist between the threatened aircraft and other nearby flying aircraft including particularly other aircraft whose safety may be affected as a result of execution of a commanded maneuver. To this end, the known indicator means do not provide the pilot with any indication as to what constitutes a safe climb or dive rate when executing the commanded escape maneuver and this is a significant deficiency of the known indicators. The present indicator means overcomes these and other shortcomings of known devices by providing an indicator in which are combined collision avoidance command indications and information as to maximum safe rates of climb or dive when executing the commanded maneuver. The maximum safe climb and dive rates can be presented in the subject indicator in various ways such as by illuminating adjacent peripheral sectors on the indicator means, by the positions of one or more movable shutters or pointers, and by other means as are disclosed herein.

It is therefore a principal object of the present invention to provide an improved cockpit instrument for use with collision avoidance systems and the like.

Another object is to make a safer collision avoidance system.

Another object is to minimize the possibility that a pilot making a maneuver to avoid one threatening condition will put his aircraft in a threatening condition with respect to another aircraft.

Another object is to reduce the number of instruments required in an aircraft.

Another object is to combine in a single cockpit instrument collision avoidance information and information as to rate of climb and what constitutes a maximum safe rate of climb or dive.

Another object is to provide a relatively simple easy to read instrument for aircraft which indicates to the pilot at a glance the presence of a threatening condition, how to avoid it by maneuvering, and how rapidly he can safely execute the escape maneuver.

These and other objects and advantages of the present indicator means will become apparent after considering the following detailed specification which covers several embodiments of the subject device in conjunction with the accompanying drawings, wherein.

Figure 1:
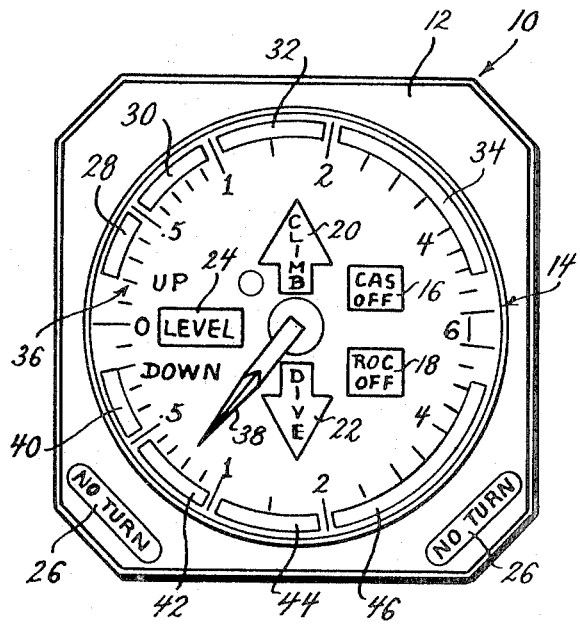
FIG. 1 is a front elevational view of a cockpit panel indicator constructed according to the present invention.

Referring to the drawings more particularly by reference numbers, number 10 in FIG. 1 refers to an indicator for a collision avoidance system which combines collision avoidance information with information as to rate of climb and maximum possible safe rate of climb and dive, which instrument is for mounting on the cockpit control panel of an airplane and is constructed according to the present invention. The indicator 10 is designed to be constructed as a single compact instrument of a size and shape to be installed at a suitable location on the cockpit instrument panel. The instrument includes a mounting plate 12 and an indicator portion 14. The indicator portion of the embodiment shown in FIG. 1 is round and includes various portions which can be illuminated in a particular way as will be explained. For example, the indicator portion 14 includes a portion 16 with the legend CAS OFF which means Collision Avoidance System Off. The portion 16 is illuminated whenever the collision avoidance system is in its inoperative or turned off condition. Another portion 18 has the legend ROC OFF, which means Rate Of Climb Off and this portion is illuminated whenever the rate of climb indicator means to be described later are inoperative or in a turned off condition. The portions 16 and 18 can also be energized when a malfunction occurs which makes the control circuits associated therewith inoperative or in a turned off condition.

The indicator portion 15 also has an upwardly pointing arrow 20 with the legend CLIMB, and the arrow 20 is illuminated whenever it has been determined by the collision avoidance system that a threatening condition exists in which case the pilot is commanded to maneuver his aircraft by climbing to avoid or escape from the threatening condition. In like manner, the indicator includes a downwardly pointing arrow 22 with the legend DIVE. This arrow is illuminated whenever it has been determined that a threatening condition exists in which the pilot is commanded to dive to make his escape. If no threatening condition exists the arrows 20 and 22 will not be illuminated. There may also be situations where two or more threatening conditions exist at the same time which will cause both the climb and dive arrows 20 and 22 to be simultaneously illuminated. Whenever this occurs another indicator 24 identified by the legend LEVEL will be illuminated instead of the climb-dive arrows and will be a command to the pilot that he should maintain his present altitude.

The indicator 10 may also include other means 26 which bear the legend NO TURN which are illuminated to command the pilot not to turn, or not to turn in a particular direction. Indications similar to the indicator means 16, 20, 22, 24 and 26 are all disclosed in U.S. Pat. No. 3,341,812, and it is not deemed necessary in this disclosure to again describe how the signals are generated to energize these indicator means.

The indicator portion 14 of the device 10 in the embodiment when in FIG. 1 also has means which indicate the maximum safe rate of climb of dive that the pilot can use when executing a commanded escape maneuver. The maximum safe rate of climb is indicated by a plurality of peripheral segments 28, 30, 32 and 34 positioned as shown. These segments are illuminated in order depending on the altitude separation between the "own" aircraft and aircraft nearby flying at higher altitudes which except for their present altitude separation would represent collision threats. For example, if there are no such aircraft flying at higher altitudes none of the segments 28-34 will be illuminated indicating that there are no restrictions on the climb rate. If only the segment 34 in illuminated this means it is safe to climb at any rate up to about 2,000 feet per minute. If segments 32 and 34 are illuminated then it is safe to climb at a rate up to about 1,000 feet per minute. By the same token if segments 30, 32 and 34 are all illuminated at the same time then it is not safe to climb at a faster rate than about 500 feet per minute, and if all of the segments 28-34 simultaneously energized only a very small climb rate is permissible. Which of the segments will be illuminated, as stated above, depends on how far above the "own" aircraft other aircraft which have ranges and range rates that are in the threatening range are flying. This maximum safe rate of climb information is particularly important to know under conditions when the climb arrow 20 is energized although it is also helpful to know at other times as well. The rate of climb segments also have associated with them a scale 36 which gives the approximate rate of climb and dive information of a feet per minute basis. For example, the scale extends from a zero scale reading on the left to a six 6) reading on the right, the six reading representing a 6,000 feet per minute rate of climb or dive, the upper half of the scale being the climb half and the lower half the dive half.

The pilot's actual rate of climb or dive is indicated on the subject instrument by means of the rotatable pointer 38 which may be of conventional construction and operation. In the device as described it should now be apparent that to be on the safe side the pilot should never climb at a rate such that the pointer 38 moves onto an illuminated segment 28–34 of the rate of climb indicator.

The safe diving rates are provided by other segments 40, 42, 44 and 46 which extend around the lower half of the instrument and are similar in construction and operation to the segments 28–34. Safe maximum rate of dive information is particularly important to know when the dive arrow 22 is illuminated but is also valuable at other times as well including when a lower flying aircraft satisfies all of the conditions for producing a threat except for its altitude. Also, it should be recognized that the subject instrument will indicate not only the maximum safe climb and dive rates but also the actual climb and dive rates regardless of whether a threatening condition exists and/or is indicated by appropriate command.

It is also contemplated to illuminate the climb and dive segments in reverse order from that described above, that is by illuminating the left-hand segments 28 and 40 first and so on. If this were done the pilot could then climb at any rate up to the first nonilluminated segment. Such a construction would have disadvantages in that it would mean that some of the segments would have to remain energized most of the time and such a construction is also not as logical a way to display the information. However, either way of operation could be used without departing from the spirit and scope of the invention. The means for energizing the subject indicator 10 ill be described later in connection with FIG. 9.

Figure 2:
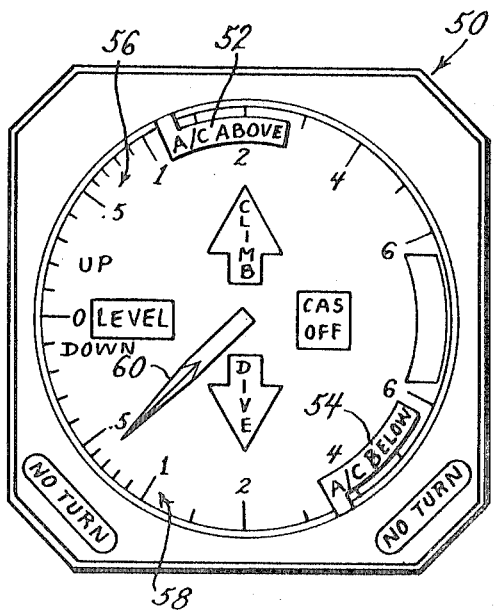
FIG. 2 is a front elevational view showing a modified form of the panel indicator of FIG. 1.

FIG. 2 shows another embodiment 50 of an indicator which is similar to the indicator 10 shown in FIG. 1, particularly as regards the collision avoidance portions thereof. However, the safe rate of climb and dive portions of the indicator 50 are somewhat different from the rate of climb and dive means of the device of FIG. 1. For example, instead of having illuminating stationary segments, the device of FIG. 2 has two movable segments 52 and 54 which are associated with respective rate of climb and dive scales 56 and 58. The position of the movable member 52 on the rate of climb scale 56 depends on the altitude separation between the aircraft in which the instrument 50 is located and other aircraft that are potential threats flying thereabove, and the position of the rate of dive member 54 depends on the altitude separation to the nearest potentially threatening aircraft flying therebelow. In the device as shown in FIG. 2, the member 52 is positioned to indicate that the maximum safe rate of climb is approximately 1,200 feet per minute and the member 54 is positioned to indicate that the maximum safe rate of dive is approximately 3,500 feet per minute. The actual rate of altitude change is indicated by pointer 60 which is indicating a dive rate of approximately 700 feet per minute. Except for the variations in the manner in which the maximum safe rate of climb and dive are indicated in the device of FIG. 2, the device is substantially the same and operates in substantially the same way as the device disclosed in FIG. 1.

Figure 3:
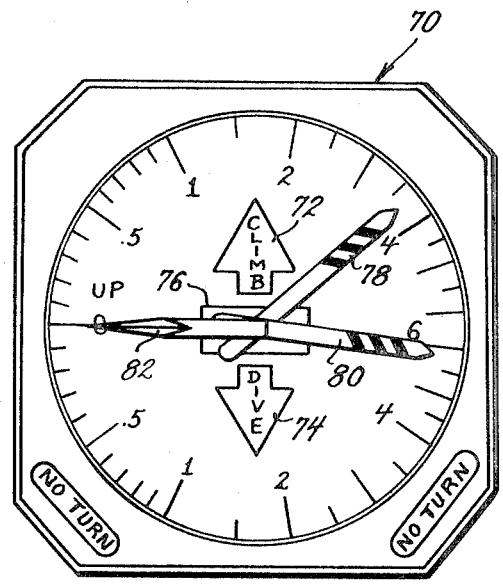
FIGS. 3-7 are front elevational views showing other modified embodiments of the subject panel indicator.

FIG. 3 shows another embodiment 70 which includes the same or similar collision avoidance portion combined with a somewhat style rate of climb and dive portion. The collision avoidance portion includes an up or climb arrow 72, a down or dive arrow 74, and a level off indicator means 76. These operate in substantially the same way as the corresponding parts in the devices of FIGS. 1 and 2. The indicator 70 also includes a movable pointer 78 which serves the same purpose as the lighted segments of FIG. 1 and the member 52 in FIG. 2 indicate on an associated scale the maximum safe climb rate. Another similar pointer 80 indicates the maximum safe rate of dive. Still another movable pointer 82 indicated the actual rate of climb or rate of dive and operates in the usual manner for such devices, its permissible safe range of movement at any given time being limited by the positions of the pointers 78 and 80 which tell the pilot what maximum safe climb and dive rates he may use. Except for these relatively minor differences mainly in design, the instrument 70 is similar to the instruments disclosed above.

Figure 4:
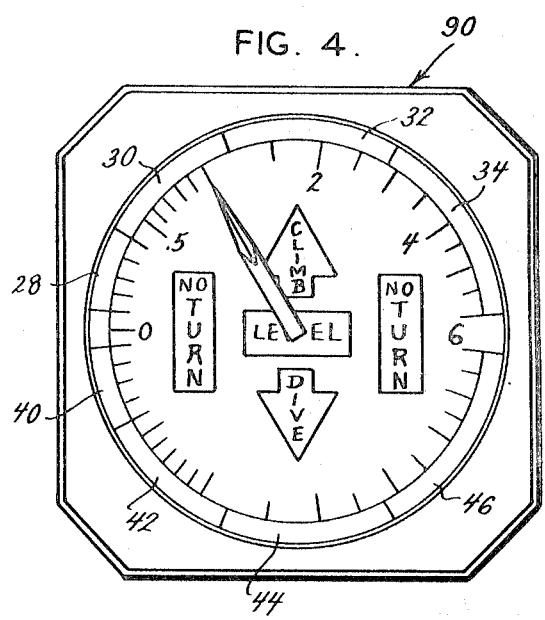

FIG. 4 shows another embodiment 90 that is very similar in construction and operation to the embodiment shown in FIG. 1 the main difference being in the arrangement of the components. The embodiment 90 also uses adjacent illuminable segments located about the periphery to indicate maximum safe dive and climb rates. This is to be distinguished from the embodiment of FIG. 1 which has spaced segments. Also the device of FIG. 4 has the NO TURN indicator means positioned more centrally than in the construction of FIG. 1.

Figure 5:
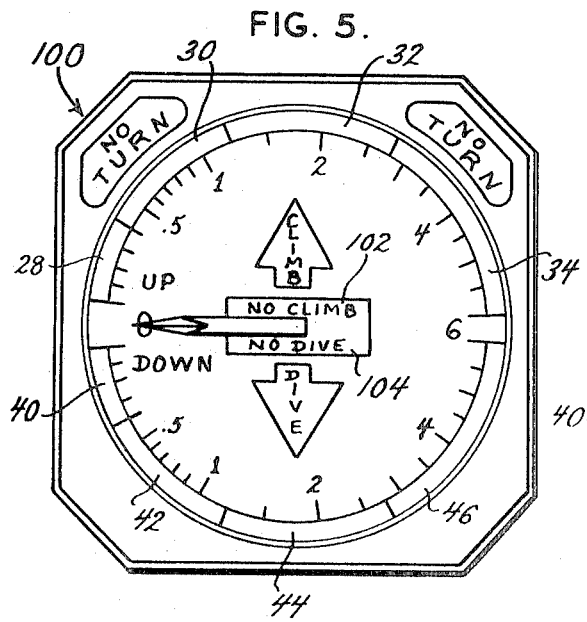

The embodiment of FIG. 5 is also very similar to that of FIGS. 1 and 4 including having peripheral illuminable segments. Also in the device of FIG. 5 a special illuminable portion 102 is provided to command the pilot, when illuminated, not to climb, and another portion 104 is illuminated to command the pilot not to dive. These indications are used in lieu of the LEVEL indication included in the other embodiments.

Figure 6:
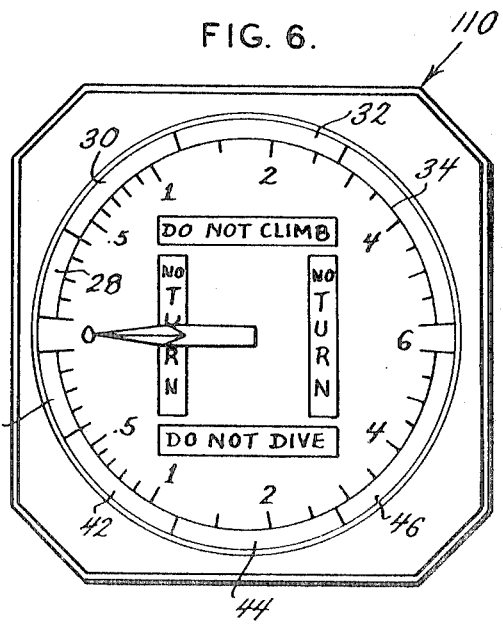

The embodiment 110 shown in FIG. 6 is also very similar to several of the embodiments discussed above, and its operation is likewise substantially the same.

Figure 7:
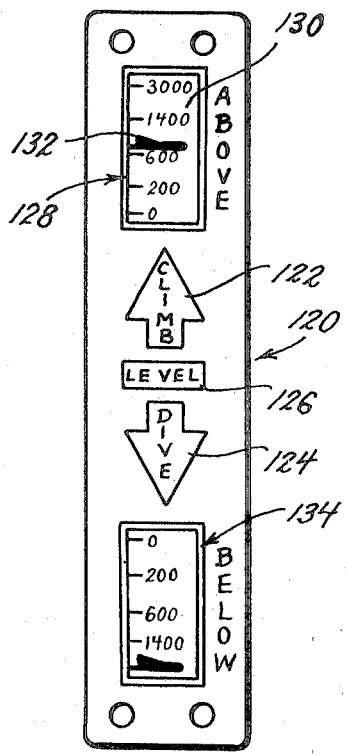

FIG. 7 shows another embodiment 120 which includes a climb indicator 122, a dive indicator 124 and a level indicator 126. The device 120 also includes a somewhat different style of climb indicating means 128 that has a scale 130 without a movable pointer 132 shown in the shape of an outline of an airplane. The position of the airplane pointer 132 will vary depending upon how far above the aircraft in which the instrument is located another aircraft is flying. In the drawing the pointer 132 is shown indicating the presence of an airplane flying about 800 feet above the aircraft in which the instrument is located and this indicates to the pilot how fast he can safely climb. Naturally, if he climbs the vertical separation would be reduced if the higher flying craft is not changing its altitude.

The instrument 120 also includes a dive rate indicator 134 which is similar to the climb rate indicator to indicate how far below another aircraft is flying. This indicator is shown such that it does not indicate the presence of any aircraft flying within about 3,000 feet below the subject aircraft. It is therefore relatively safe for the subject aircraft to dive even at a relatively rapid rate to avoid collision, while if it receives a climb command its climb rate would be much more curtailed.

Figure 8:
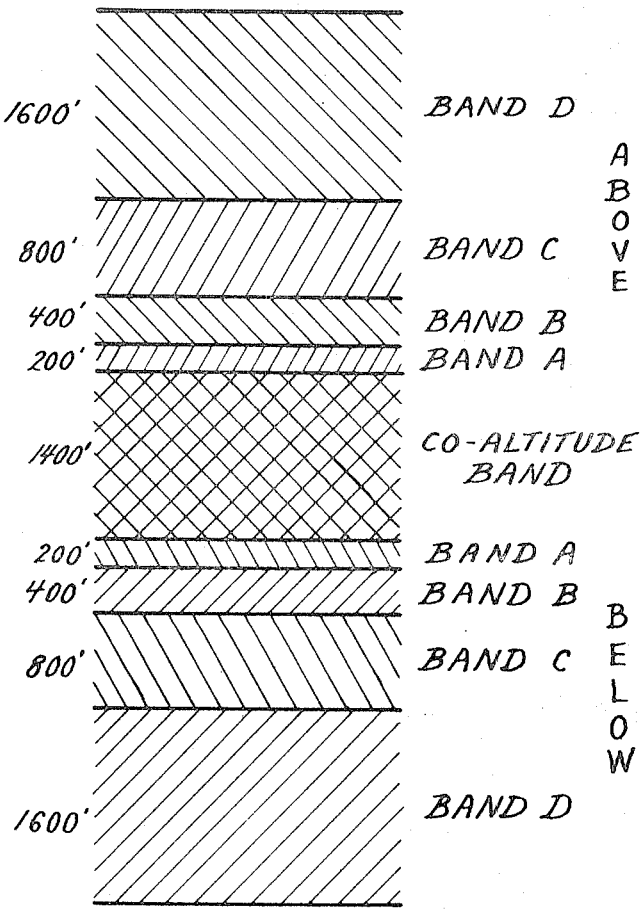
FIG. 8 is a diagram of an in-flight aircraft showing altitude bands extending upwardly and downwardly therefrom.

FIG. 8 shows how the altitude bands that extend above and below an in-flight aircraft and which are established for use with the indicator means disclosed herein. These bands are labeled A, B, C and D above, and A, B, C, D below. The drawing also shows typical widths in feet for these bands, the bands becoming progressively wider going away from the aircraft. The center or coaltitude band extends above and below the aircraft equal distances in both directions and is the band which defines the region altitudewise in which a threatening condition can exist which will require execution of an escape maneuver. Any other aircraft whose range and range rate are such in relation to the "own" aircraft that they establish the conditions necessary to produce a threat warning will only produce a threat condition in the "own" aircraft if both of the said aircraft are within the coaltitude band with respect to each other. This means that there must be some overlapping of the coaltitude bands established for the two or more aircraft involved for a coaltitude condition to exist with respect to them. It two or more aircraft satisfy the range and range rate requirements for producing a warning condition but their altitudes differ by an amount such that their altitude bands do not overlap to any degree, no threat condition will be established with respect thereto and neither the up, down, or level off indicator means will be energized. These conditions may, however, be sufficient to energize one or more of the segments 28-34 or 40-46 (FIG. 1) or the corresponding means on the other forms of indicators disclosed to let the pilot know how fast he can safely climb or dive. The circuit of FIG. 9 also includes means in each aircraft so equipped by which the said lights associated with the said indicator segments are energized as will be explained.

Figure 9:
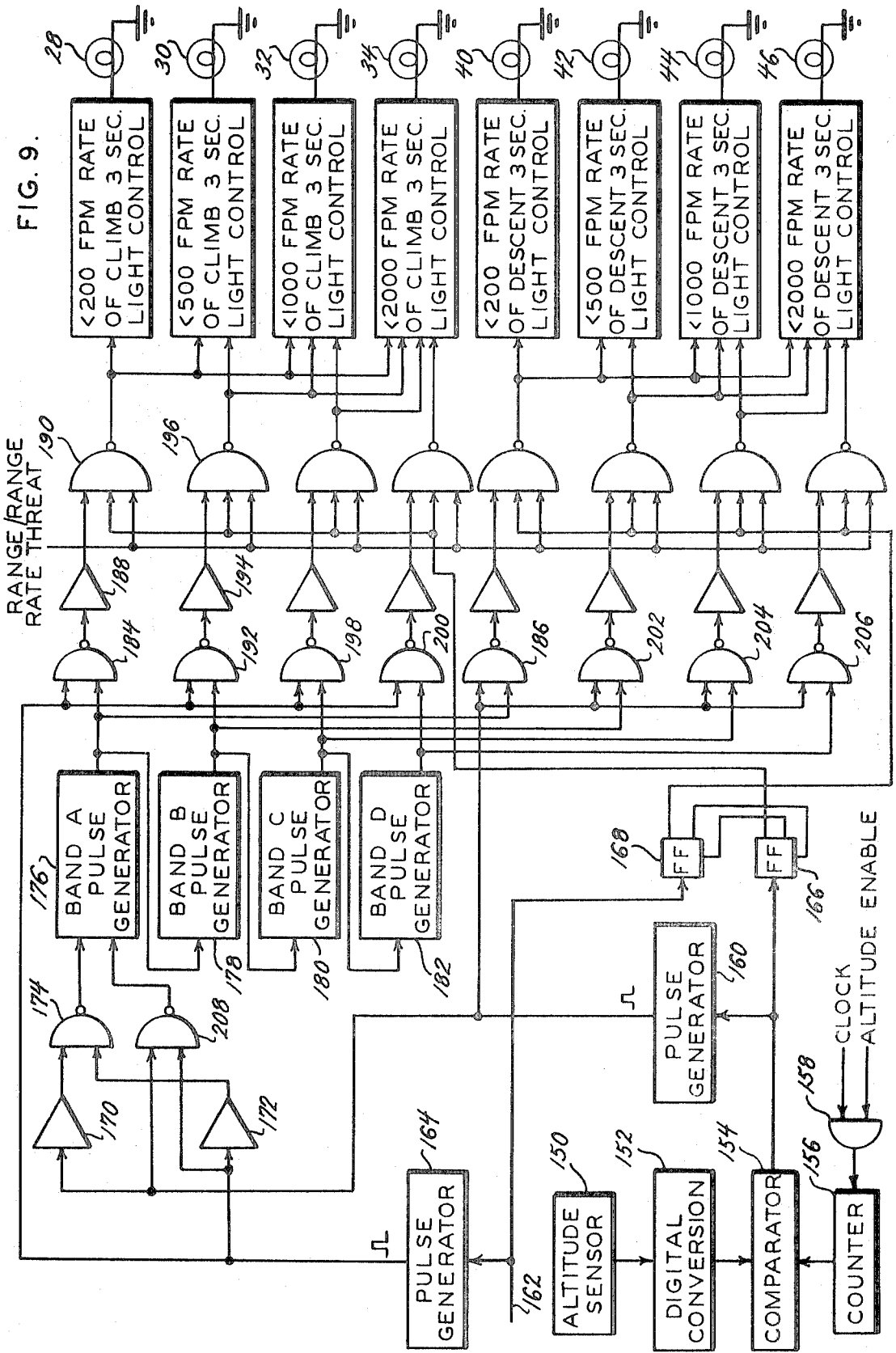
FIG. 9 is a circuit diagram partly in block form of means for energizing the means on the subject indicators which indicate the maximum safe climb and dive rates; and, FIG. 10 is a sequence chart of the time relationship of the signals used to energize the maximum safe rate of climb and dive indicator means.

The circuit of FIG. 9 includes altitude sensor means 150 which produce output signals that represent the altitude of the own aircraft. These signals are fed to a digital conversion circuit 152 which converts them into a suitable digital form. It is also possible to use analog signals but the particular embodiment shown is the digital form. The output of the digital conversion circuit 152 is fed as one of two inputs to a comparator circuit 154. When the own aircraft is operating in its own assigned message slot it will also receive another input from a counter circuit 156 enabled by the output of a NAND-gate 158 which receives inputs from a clock source and from an altitude enable input. The outputs of the counter 156 are compared with the outputs of the digital conversion circuits 152 in the comparator circuit 154 and coincident output signals are produced therefrom and are used to energize a pulse generator 160 so that it will generate an output pulse which is time located and wide enough to locate and represent the coaltitude band of the own aircraft. This band is shown in the drawing as a blip. Referring again to FIG. 8, the position and width of this blip represents the band labeled coaltitude band which band extends a predetermined distance above and below the own aircraft. This is the band which is used for comparing to the corresponding bands of other aircraft to determine when a coaltitude condition exists therebetween. Any overlapping of these bands will so indicate. If the range, range rate and coaltitude conditions necessary to produce a warning and to indicate that an escape maneuver should be made exist simultaneously, then one or more of the up, down and level off indicators 20, 22 and 24 of the indicator 10 will be energized to command the pilot to make a maneuver to avoid being on a collision course.

Input signals received from other aircraft are received at the own aircraft on lead 162, and the time of occurrence in the transmitting aircrafts message slot of the negative going edge of the signals is used to generate a coaltitude band to represent the position of the said transmitting aircraft. This is done by feeding each received signal to another pulse generator 164 that produces output signals whose time duration represents their coaltitude bands. As already stated, whenever the coaltitude band of the own aircraft as represented by the output of pulse generator 160 to any extent is coincident with the coaltitude band of another aircraft by a comparison of their coaltitude bands, then with respect to those aircraft a coaltitude condition exists.

The same altitude signals which are fed to the pulse generators 160 and 164 are also fed respectively to flip-flop circuits 166 and 168 where they are used to make a determination as to which of the aircraft whose altitudes are being compared is at the higher and which at the lower altitude. In the case of aircraft that are coaltitude with each other and also meet the other criteria for establishing a threat, the first of the flip-flops 166 and 168 to be triggered will determine which of the aircraft should be instructed to dive and which should climb to avoid collision. The construction and operation of the flip-flops 166 and 168 and their associated output circuits are shown only generally in FIG. 9 and are not part of the present invention as such.

Figure 10:
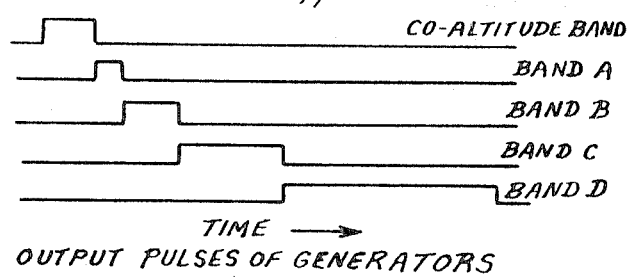

The output coaltitude band information produced by the pulse generators 160 and 164 are fed respectively to inverter circuits 170 and 172 which in turn feed their outputs to the inputs of a NAND-gate 174. The outputs of the NAND-gate 174 are fed to another pulse generator 176 that produces an output the time duration of which represents in magnitude the altitude bands A tat are immediately adjacent above and below the coaltitude band. In this regard it should be noted that the outputs of the NAND-gate 174 for reasons that will be explained later only occur when a coaltitude condition does not exist between the aircraft being compared. This means that there must be some time lapse between the coaltitude band signals of the two aircraft. When this occurs, the trailing edge of the first coaltitude signal to reach the NAND-gate 174 will produce an accurately timed signal that will initiate operation of the pulse generator 176. The first such signal can be either the coaltitude signal of the own or of the other aircraft. This means that the pulse generator 176 will commence producing an output signal immediately after the end of the first coaltitude signal received and the duration of the output produced by the pulse generator 176 will represent the width of the A-bands. After the pulse generator 176 has generated its A-altitude band pulse the end of the pulse will trigger another pulse generator 178 which will then commence counting for another predetermined time corresponding to the width of the B-bands above and below the aircraft, and in similar manner the end of the pulse generated by the generator 178 will trigger a third pulse generator 180 which will generate an output to represent the C-bands and finally the trailing edge of the output signal of the generator 180 will trigger still another pulse generator 182 to represent the D-bands. The time durations and hence the widths of the various bands can be selected as desired, it being usually preferred to have the bands become progressively wider as they become more remote from the aircraft. This is illustrated in FIG. 10 where the relative lengths of the outputs of the generators 176, 178, 180 and 182 are shown.

Once the first signal received by the NAND-gate 174 has been used to energize the pulse generator 176 the arrival of a second signal at a later time either from the "own" or from the other aircraft, depending upon which signal arrives first, will be used in the above-below status logic portion of the circuit of FIG. 9, to energize the appropriate segments on the cockpit indicator means as will be described.

The outputs of the pulse generator 176 which correspond to the first band above and below the coaltitude band is fed as one of two inputs to NAND-gates 184 and 186 in the above-below logic portion of the circuit. The gate 184 also receives the output signals of the pulse generator 164 which pulse generator is associated with signals received from other aircraft as already described. This means that during the time an output signal is being generated from the pulse generator 176 in band A and at a time when the pulse generator 164 is also generating an output, both outputs will be applied to the inputs of the NAND-gate 184 so that the gate circuit 184 will produce an output which is fed to an inverter circuit 188 and from there to an input to another NAND gate circuit 190. The gate circuit 190 receives other inputs including the output of the flip-flop circuit 166 indicating that the other aircraft is above the "own" aircraft. The gate circuit 190 also receives signals from the collision avoidance portion of the circuit to indicate that the conditions exist as to range and range rate that are necessary to produce a threat. If all three conditions are met so that the gate circuit 190 has signals an all three of its inputs simultaneously, it will produce an output to energize the light bulb associated with the segment 28 on the cockpit indicator of FIG. 1. This same output from the gate 190 will also be available to energize all of the other indicator segments 30, 32 and 34 to indicate to the pilot that he cannot safely climb at a faster rate than about 200 feet per minute.

If the output of the pulse generator 164 occurs during the time that the pulse generator 178 instead of the pulse generator 176 is producing an output, and assuming the other conditions described above also exist in connection with the operation of the gate 190, then a second gate 192 in the logic portion of the circuit instead of the gate 184, will produce an output for feeding to an associated inverter circuit 194, and these in turn will be fed to a NAND-gate 196 instead of to the NAND-gate 190. Under these conditions the indicator segment 28 will not be energized but instead of the segment 30 will be energized as well as the segments 32 and 34, and the pilot will be given authority to climb at a somewhat more rapid rate than before which is indicated in FIG. 1 as being about 500 feet per minute. Similar means and conditions exist for energizing the segments 32 and 34 using other gates 198 and 200 and their associated inverter and gate circuits as shown in FIG. 9. It is not deemed necessary, however, to describe the structure and operation of these circuits in detail since they are basically repeats of the above circuits.

If the coaltitude output signals of the pulse generator 164 associated with altitude signals received from other aircraft occur before the coaltitude outputs of the "own" pulse generator 160 in a particular message slot, this means that the other aircraft is below instead of above the "own" aircraft, and under these circumstances the pilot of the "own" aircraft will be instructed as to the maximum safe rate of dive instead of climb. In this case, the pulse generators 176, 178, 180 and 182 will produce outputs the same as aforesaid but this time due instead to the fact of the occurrence of the coaltitude signals from the other aircraft ahead of the coaltitude signals from the "on" aircraft. These signals are fed to the gate circuit 186 and the other associated gate circuits 202, 204 and 206 shown in the lower portion of the above-below status logic portion of the circuit. The other inputs to these gate circuits will be from the own altitude output pulse generator 160 instead of from the pulse generator 164 associated with the other aircraft as in the circuits described above. The information received at the gates 186, 202, 204 and 206 together with other signals similar to those described above can be used to selectively energize the instrument segments 40, 42, 44 and 46 to indicate the maximum safe rates of dive. The same conditions exist for energizing the dive segments as the climb segments except that in the case of the dive segments the own aircraft's coaltitude pulses occur after the coaltitude pulses of the other aircraft and is used by the logic status circuits instead of the altitude pulses from other aircraft.

It should be realized also that there may be two or more aircraft that represent threats to each other except for an altitude difference at the time the segments are energized, and that at the same time coaltitude pilots may be instructed to execute an escape maneuver. It is also possible to have a condition where a pilot is limited both as to his safe rate of climb and dive at the same time. Also, if two or more aircraft both represent threats but at different altitudes above or below then the segments will be energized according to which of the other aircraft is in the nearest band to its coaltitude band.

An optional feature of the circuit resides in an inhibit circuit which includes NAND-gate 208. The NAND-gate 208 receives the outputs of the pulse generators 160 and 164 and has its output connected to the pulse generator 176. If a coaltitude condition exits between two aircraft whose altitude are being compared, that is, if the coaltitude band of the own aircraft and the coaltitude band of a threatening aircraft overlap each other to any degree, then the NAND-gate 208 will simultaneously receive signals from the generators 160 and 164 and will produce an output which will operate to prevent operation of the pulse generator 176 at that time. This is an important feature because it prevents the subject device from indicating a climb or dive warning and a safe rate of climb or dive from the same piece of information. This inhibit condition will only last for the length of the message slot assigned to the aircraft that represents a threat, and in all other assigned message slots the operation will occur as described. Hence the NAND-gate 208 is provided to inhibit operation of the pulse generator 176 in the message slot in which a coaltitude threatening condition actually is indicated.

Thus there has been shown and described novel indicator means for use in aircraft and particularly aircraft equipped with collision avoidance equipment which indicator means combine collision avoidance information with rate of climb and with maximum safe rate of climb information, which indicator means fulfill all of the objects and advantages sought therefor. It will be apparent, to those skilled in the art, however, that many changes, variations, modifications and other uses and applications of the subject means are possible and within the scope of the present invention. All such changes, modifications, variations and other uses and applications which do not depart from the spirit and scope of the invention are deemed covered by the invention which is limited only by the claims which follow.

What is claimed is:

1. An instrument for the cockpit of an aircraft comprising means for indicating whether the pilot should climb, dive or level off to escape being on a collision course with another aircraft, means to indicate rate of change of altitude, and means to indicate approximate maximum safe rates of altitude change to avoid maneuvering into a position of being on a collision course with another aircraft which except for a difference between its altitude and the altitude of the aircraft in which the instrument is located would be on a collision course therewith.

2. The instrument defined in claim 1 wherein said means to indicate approximate maximum safe rates of altitude change include scale means subdivided into rates of altitude change bands extending above and below the aircraft in which the instrument is installed, means responsive to the altitude difference between the said aircraft and other aircraft which except for their altitude separation would represent threats to said aircraft, said last named means including means for energizing bands in said scale to indicate the maximum safe rates of altitude change.

3. An aircraft instrument for indicating the approximate maximum safe rate of altitude change the aircraft can make without placing itself on a collision course with another aircraft flying at a different altitude, said instrument including a scale and means cooperative with said scale to indicate the aircraft's actual rate of altitude change, receiver means including means responsive to information received from other aircraft for determining therefrom the range, range rate and altitude of said other aircraft in order for the receiving aircraft to determine if its course will cross the course of any of the other aircraft in the sky, means in said aircraft for determining the altitude thereat and for comparing its altitude with the altitude of other aircraft whose transmissions it receives, and means on the instrument energizable in response to the altitude separations between the receiving aircraft and other aircraft that are flying on courses that will cross the receiving aircraft's flight path to provide a visual indication in the cockpit thereof as to the maximum safe rate of altitude change that can be executed without endangering any of the involved aircraft.

4. The aircraft instrument defined in claim 3 wherein said scale is subdivided into actuatable bands, and means for selectively activating the bands in response to the altitude separation between the aircraft in which the instrument is installed and other aircraft flying at different altitudes and which are on flight paths that will cross the flight path of the said aircraft within a predetermined time assuming the aircraft involved stay on the same courses.

5. An instrument for installing in the cockpit of aircraft comprising means for indicating when the aircraft is on a collision course with another aircraft based on an evaluation of range, range rate and altitude information transmitted therebetween, said indicating means including means for indicating what maneuver the pilots should make to escape from being on the collision course, said indicating means including means to indicate whether the pilot should change altitude of level off the escape being on a collision course, said instrument including other means to indicate actual rate of altitude change and means to indicate maximum safe rate of altitude change taking into account the altitude separation between the aircraft in which the instrument is installed and other aircraft which except for an altitude difference would be on collision course with the said instrumented aircraft.

6. The instrument defined in claim 5 wherein the means to indicate maximum safe rate of altitude change include an altitude rate of change scale divided into a plurality of segments, and means for selectively energizing said segments depending upon the altitude separation between the aircraft in which the instrument is installed ant other aircraft which except for their altitude would be on a collision course with the said instrumented aircraft.

7. The instrument defined in claim 5 wherein the means to indicate the maximum safe rate of altitude change include an altitude rate of change scale and means movable on the instrument adjacent to said scale to positions corresponding approximately to the altitude separation between the aircraft in which the instrument is installed and the nearest other aircraft flying above and below, which other aircraft except for their altitudes would be on collision courses with the aircraft in which the instrument is installed.

8. The instrument defined in claim 5 including means to inhibit operation of the means to indicate maximum safe rate of altitude change with respect to any other aircraft that is determined to be on a collision course with the instrumented aircraft.

9. An instrument for the cockpit of aircraft which combines rate of climb, maximum safe rate of climb, and collision avoidance information comprising means for indicating when an aircraft is on a collision course with another aircraft taking into account the altitude proximities of the aircraft involved, said collisions course indicating means including means to indicate whether the aircraft should climb, dive, or fly level to avoid remaining on a collision course, and scale means and associated pointer means on the instrument for continuously indicating the aircraft's actual rate of altitude change, said means on the instrument for indicating maximum safe rate of climb including means associated with the scale means and actuatable in response to the altitude separation between the aircraft in which the instrument in installed and other aircraft which except for their altitude represent potential collision threats with the said aircraft.

10. The instrument of claim 9 wherein said means for indicating maximum safe rate of climb include means for establishing a coaltitude band extending a predetermined distance above and below the aircraft in which the instrument is installed, and means establishing at least one other altitude band extending above and below the coaltitude band.

11. The instrument defined in claim 10 wherein said means for establishing at least one other altitude band extending above and below the coaltitude band include counter means and associated gate circuit means.

12. The instrument defined in claim 9 wherein said means for establishing at least one other altitude band extending above and below the coaltitude band include means for establishing a plurality of said bands.

13. The instrument defined in claim 9 wherein a plurality of aircraft are equipped with said instruments, each of said aircraft including means for transmitting a signal coded to represent its altitude and each of said aircraft including means for establishing a coaltitude band for itself and for each altitude signal it receives, said last named means including means for comparing the coaltitude at each receiving aircraft with the coaltitude band of each aircraft whose signal it receives, the presence of any overlapping of two of more altitude bands establishing a coaltitude condition between the said aircraft involved.

14. The instrument defined in claim 13 including means to inhibit actuation of the means for indicating the maximum safe rate of climb with respect to any signal received from another aircraft that establishes a coaltitude condition at the receiving aircraft.

15. The instrument defined in claim 13 wherein each aircraft is assigned distinct time periods within which to transmit its coded altitude signals.

16. The instrument defined in claim 13 including means for determining whether an altitude signal received from another potentially threatening aircraft should actuate means to limit the maximum safe climb or the maximum safe dive rate.

17. The instrument defined in claim 9 including gate circuit means for actuating the means associated with the scale means to indicate maximum safe rates of climb.

18. An instrument for installing in the cockpit of aircraft comprising means for indicating when the aircraft is on a collision course with another aircraft and what maneuver the pilot should make to escape from staying on said collision course, said indicating means including means to indicate whether the pilot should climb, dive or remain in level flight, other means on the instrument including a scale and means associated with the scale for indicating the maximum safe rate of climb and dive that the pilot can execute during a change in altitude taking into account the presence of other aircraft whose flight paths will cross the flight path of the said aircraft, and means on the instrument to continuously indicate the aircraft's actual rate of change of altitude.

UNITED STATES PATENT OFFICE
CERTIFICATE OF CORRECTION

Patent No. 3,614,728　　　　　　　　　Dated October 19, 1971

Inventor(s) Martin J. Borrok et al

It is certified that error appears in the above-identified patent and that said Letters Patent are hereby corrected as shown below:

Column 1, line 6, "existence" should be "to".
Column 2, line 22, "15" should be "14".
Column 2, line 48, "when" should be "shown".
Column 2, line 59, "in" should be "is".
Column 2, line 66, after "28-34" insert "are".
Column 3, line 2, "of" (second occurrence) should be "on".
Column 3, line 4, "6)" should be "(6)".
Column 3, line 37, "ill" should be "will".
Column 3, line 65, after "another" insert "indicator".
Column 3, line 67, after "somewhat" insert "different".
Column 3, line 69, after "level" insert "or level".
Column 3, line 73, after "Fig. 2" insert "to".
Column 4, line 3, "indicated" should be "indicates".
Column 4, line 33, "without" should be "with".
Column 5, line 73, "tat" should be "that".
Column 7, line 21, "'on'" should be "'own'".
Column 7, line 40, "coaltitude" should be "the".
Column 8, line 27, after "gizing" insert "selected".
Column 8, line 63, "of" should be "or".
Column 8, line 64, "the" should be "to".
Column 9, line 3, "ant" should be "and".
Column 9, line 25, "collisions" should be "collision".

Signed and sealed this 18th day of April 1972.

(SEAL)
Attest:

EDWARD M. FLETCHER, JR.　　　　　　ROBERT GOTTSCHALK
Attesting Officer　　　　　　　　　　Commissioner of Patents